United States Patent Office 3,203,893
Patented Aug. 31, 1965

3,203,893
REMOVAL FROM SEWAGE OF SURFACTANTS RESISTANT TO BIODEGRADATION
Ralph House, San Pablo, Samuel H. Sharman, Berkeley, and Demetrios Kyriacou, San Pablo, Calif., assignors to California Research Corporation, San Francisco, Calif., a corporation of Delaware
No Drawing. Filed Oct. 19, 1962, Ser. No. 231,840
4 Claims. (Cl. 210—3)

This invention concerns a method of reducing detergent concentrations in water to a relatively non-foaming level.

Although synthetic surfactants are only one of the many organic compounds to be found in sewage, they have attracted notice of the serious problem of waste disposal because of their tendency to foam at low concentrations, thus producing striking visual evidence of their presence. It is found that water in many areas, particularly industrialized and metropolitan areas, obtained from the ordinary treatment of sewage still contains a level of foam formers sufficiently high to produce foam. A common example of the synthetic surfactants which are inadequately biodegraded under the ordinary treatment is synthetic detergents (syndets) exemplified by alkyl benzene sulfonates (ABS), wherein the alkyl group is branched, as for example, tetrapropylene. Foaming occurs at concentrations of syndets in excess of about 1 p.p.m. The foam forming surfactants which do not readily undergo sewage treatment in ordinary biodegradation and whose concentration in ordinary sewage is frequently found to be sufficiently high to foam after the sewage treatment will be called "resistant surfactants."

Various methods have been suggested for reducing the concentration of the resistant surfactants to a level below which foam will not occur, usually at or below 1 p.p.m. Activated carbon treatment, while effective, is not economically feasible. Foam fractionation has recently received some interest. However, the high concentration of resistant surfactants required in the foam to permit an economically feasible evaporation and the subsequent problem of disposal of the resistant surfactants have diminished the likelihood of its application.

It has now been found that water from sewage may be obtained having not more than about 1 p.p.m. of resistant surfactants, particularly alkyl benzene sulfonates, by treating sewage in an aeration tank according to the usual methods using activated sludge, transferring the aeration tank effluent to a sedimentation tank and allowing the solids to settle, introducing the supernatant liquid or effluent from the sedimentation tank into a foaming vessel, foam fractionating the supernatant liquid in a foam fractionator, returning the foam to the aeration tank for further activated sludge treatment and collecting purified water from a lower portion of the foam fractionator. It is found that water can be obtained in a continuous manner having concentrations of resistant surfactants of about 1.0 or less p.p.m.

Various methods of treating sewage with activated sludge are well known in the art and are described in a number of texts and articles. See, for example, Sewage Treatment, 2nd Edition, Imhoff and Fair (1956), John Wiley & Sons, Inc., New York, p. 136. Basically, the process involves: (1) the continuous return of needed amounts of activated sludge to an aeration tank influent (return sludge) and the wasting of sludge in excess of these amounts (excess sludge or waste sludge); (2) the aeration of the sewage sludge (mixed liquor) to keep it aerobic; (3) the stirring of the sewage sludge mixture by air or mechanical agitation to maintain the floc in suspension and bring it into contact with suspended and dissolved matters to be removed from the sewage by the floc; and (4) the sedimentation of the aeration tank effluent to separate the activated sludge solids from the water.

In accordance with the present invention, the effluent from the sedimentation tank, which is a liquid essentially free of suspended solid matter, is transferred, usually by means of a pump, to a foam fractionating vessel. The effluent is introduced into the foam-fractionating vessel at a place intermediate the top and bottom of the liquid column, preferably above the midpoint. Gas or vapor is introduced into a lower portion of the vessel in the form of numerous bubbles. The bubbles rapidly pass upward through the sewage effluent causing moderate agitation and producing along the column a vertical concentration differential of the resistant surfactants in the effluent. Foam is produced at the upper surface of the liquid by the action of the bubbles passing through the effluent. This foam is returned to the aeration tank for further activated sludge treatment. With the upper end of the foam-fractionating vessel being closed, the force of the air flow will drive the foam into the outlet, and then the air flow and gravity will usually suffice to continue the flow of the foam through a conduit to the aeration tank. Other means, such as pumps, can be used if necessary. Foam can also be returned to the aeration tank by simple overflow from an open foam tank into a sloping trough providing gravity flow for foam return. The water in the lower portion of the foaming vessel is then removed from the vessel at a slightly slower rate than the introduction of the treated sewage into the vessel. The slower rate is required to compensate for the sedimentation tank effluent removed as foam.

The foam-fractionating vessel will usually be at least 1 foot tall and preferably be a column having a height of at least 3 feet. For practical purposes, the column will usually be in the range of about 5 to 30 feet, but may be higher, if desired. The diameter of the column will be dependent upon the height of the column as well as the rate of flow and volume of the sewage to be treated. The greater the amount of sewage which must be treated, the greater the diameter required, assuming a constant residence time and height. The column has an air inlet near the bottom, an outlet for the purified water in a lower portion of the column, an inlet for the effluent from the sedimentation tank at an intermediate point, preferably in the upper portion of the column, and an outlet for foam, connected to a conduit which returns the foam to the aeration tank for further treatment.

The foam-fractionation vessel may have a constant cross-sectional area or preferably a radially diminished cross-sectional area. The diminished cross-sectional area may be achieved in a variety of ways. A truncated cone may be used or vessels of diminishing cross-section may be placed one on top of the other to provide a single vessel of diminishing cross-section. Various designs are operative and may be used to advantage.

A design of particular interest comprises a first cylindrical vessel of relatively large diameter in a vertical position and a second cylindrical vessel of smaller diameter placed on top of the first cylinder. The second vessel is connected at the top to an expansion vessel, preferably in the form of a sphere. The sedimentation tank effluent is introduced through an inlet near the top of the first vessel, while the treated water is removed from an outlet near the bottom of the first vessel. An air inlet is also provided near the bottom of the first vessel. The expansion vessel has an outlet for the foam in its upper portion.

The first vessel has a cross-sectional area two to four times greater than the second vessel, while its height will be from one-half to one-fifth of the second vessel. The expansion vessel will usually have a maximum cross-sec tional area between the cross-sectional areas of the two vessels.

The size of the equipment used, as well as the efficiency of the treatment, will depend on the volume of sewage to be treated, the concentration of the resistant surfactants in the sewage from the sedimentation tank and the permissible level of resistant surfactants in the water finally obtained. Therefore, the various conditions and limits are for the most part dependent and must be varied in relation to each other.

The residence time of the sewage effluent in the fractionating column will depend on the variables already mentioned, as well as the efficiency of the fractionating column. Therefore, a compromise is permissible between the height of the column, which increases efficiency, and a decrease in the residence time, a short residence time being desirable for increasing the capacity of the equipment. The time range for the residence will, therefore, be in the order of about 10 minutes to 24 hours under usual conditions. Residence times in the range of 10 minutes to 2 hours are preferred.

The amount of gas required will depend on the amount of resistant surfactants present, as well as the height of the foam-fractionating column. The gas, usually air, is measured as cubic feet of free air per gallon of sewage treated. Amounts in the range of 0.01 to 10 cubic feet per gallon are operative, but amounts in the range of 0.1 to 5 cubic feet per gallon are preferred.

The gas should be introduced into the sewage in the form of small bubbles. Bubbles as small as 0.05 mm. may be used and depending on the size of the foam fractionator may be as large as 5 cm. However, the bubbles will usually be of the order of 0.1 to 1 cm. diameter. Bubbles may be formed in a variety of ways, but they are most conveniently formed by passing the air through a coarse, porous plate. The porous plate will be of a size to cover a sufficient cross-sectional area so that a large proportion of the sewage in the foam fractionator will be agitated by the gas.

A significant diminution in the concentration of the resistant surfactants may be obtained with sewage having as low as about 1 p.p.m. of resistant surfactants or as high as 20 p.p.m. The chemical oxidation demand (COD) of the raw sewage, which includes the surfactants present, will usually be in the range of about 100 p.p.m. to 500 p.p.m. After treatment of the raw sewage, the COD will usually be as low as 20 to 200 p.p.m.

The following variations in the above process are found to improve the efficiency of the sewage treatment. By using an expansion chamber in the foaming area of the foam fractionator, that is, the area intermediate the foam outlet and surface level of sewage effluent, concentration of the resistant surfactants in the foam can be achieved. By concentrating the resistant surfactants, less water will be recycled to the aeration tank to be treated, increasing the efficiency of the system in the amount of water treated per unit time. Greater efficiency in the removal of resistant surfactants is also achieved by using a plurality of foam fractionators rather than a single foam fractionator. It is found that two columns of half the height of a single column can provide a much more efficient removal of the resistant surfactants than a single column.

The following examples are by way of illustration and are not intended to be limiting.

*Example I*

A small scale foaming apparaus for laboratory use was constructed. It consisted of a 2 liter round flask equipped with a Vigreux column, approximately 50 cm. long and 2 cm. wide. Atop the Vigreux column was fitted a 1 liter round flask with a 0.8 cm. tubular outlet through which the foam was passed into a receiver. The influent was fed near the middle of the 2 liter flask while effluent was withdrawn from the bottom of the flask. Aeration was accomplished by injecting humidified air through an air dispersion tube extending to the bottom of the 2 liter flask. Air rates were measured on a flow meter and were adjusted so that the liquid column in the Vigreux column never lost continuity with the bulk liquid in the 2 liter flask.

With a feed solution containing 10 p.p.m. of ABS, wherein the ABS is predominantly tetrapropylene benzene sulfonate, air was introduced at a rate of about 500 to 600 ml. per minute. The residence time for the feed solution was maintained at about 2 hours. The effluent was found to have about 1 p.p.m. of ABS. When the time was increased to 11.5 hours, the ABS concentration in the effluent dropped to 0.45.

With a feed containing 3 p.p.m. of ABS and a residence time of 2.6 hours, the concentration of ABS in the effluent was reduced tenfold to 0.3 p.p.m. and ABS concentration in the foam was 1.24%.

*Example II*

In a sewage treating system for purifying 1,000,000 gallons of water per day, an aeration tank is used of approximately 250,000 gallons capacity. The activated sludge has an average concentration of about 2,000 to 3,000 p.p.m., the sewage having a chemical oxygen demand (COD) of about 300 to 350 p.p.m. The ABS concentration of the sewage introduced is on an average about 5 to 10 p.p.m. The sewage is treated for 6 hours in the aeration tank and then transferred to a sedimentation tank. After standing for about 1 to 2 hours, the supernatant liquid, relatively free of suspended solids, is then pumped to a foam-fractionating vessel having a capacity of about 42,000 gallons. The vessel is approximately 18 feet in diameter and about 22 feet high, enclosed at both ends. At the bottom of the foam-fractionating vessel are several air inlets fitted with coarse porous plates. The effluent from the sedimentation tank is pumped to a point about 14 feet from the bottom of the vessel. This point is about 2 feet below the liquid level. Air is passed into the column at a rate of about 1 cubic foot per gallon of sewage. The flow of liquid is maintained at a rate which permits a residence time in the column of about 1 hour. The treated sewage water is removed from the vessel through an outlet at about 1½ feet from the bottom of the vessel. The water obtained has less than 1 p.p.m. of alkyl benzene sulfonate. The foam which is recycled has ABS in a range of about 200 to 250 p.p.m. and an amount of water which is about 1% of the total sewage treated. The sewage water effluent from the foam-fractionating vessel has a COD on the average of about 75 to 90.

It is further found that by recycling the foam, other organics in the water are also removed, thus lowering the BOD and COD. The water obtained is non-foaming and also has a lower concentration of undesired organic contaminants.

It is evident from the foregoing examples that by means of combining an aeration tank using an activated sludge treatment, and a settling tank, which are both already available in most sewage operations, with a foam fractionator and recycling the foam, the efficiency in removal of the resistant surfactants is greatly enhanced. Thus, with only a moderate outlay for extra equipment and a slight decrease in the amount of sewage treated with the existing equipment, water may be obtained which has sufficiently low concentrations of resistant surfactants so as to be non-foaming.

As will be evident to those skilled in the art, various modifications on this process can be made or followed, in the light of the foregoing disclosure and discussion, without departing from the spirit or scope of the disclosure or from the scope of the following claims.

We claim:
1. A method of removing surfactants which are resistant to biodegradation from sewage which comprises treating the sewage in an aeration tank with activated sludge, transferring the treated sewage to a sedimentation tank and allowing the solids to settle, transferring the supernatant liquid as effluent from the sedimentation tank to a foam-fractionating vessel, rapidly passing gas through said sedimentation tank effluent in said vessel for a period of time in the range of about 10 minutes to 24 hours producing foam in an upper portion of said vessel, returning the foam from the upper portion of the vessel to said aeration tank and collecting water having not more than about 1 p.p.m. of resistant surfactant from a lower portion of said foam-fractionating vessel.

2. A method according to claim 1 wherein said foam-fractionating vessel is a column having a height in the range of from 1 to 30 feet.

3. A method according to claim 1 wherein the amount of air is introduced at a rate of from 0.1 to 10 cubic feet per gallon of sewage.

4. In a process for treating sewage containing surfactants resistant to biodegradation by aerating the sewage in the presence of activated sludge in a treating zone and settling the mixture after aeration to obain a supernatant liquid effluent, the method of reducing said surfactant content of the effluent which comprises passing the supernatant liquid effluent into a foam fractionation zone and there passing gas through the liquid to produce a foam in the upper portion of said foam fractionation zone, returning the foam to the treating zone and withdrawing liquid having a substantially reduced surfactant content from the lower portion of said foam fractionation zone.

References Cited by the Examiner
UNITED STATES PATENTS 2,987,186    6/61    Burgoon et al. _____ 210—15 X

OTHER REFERENCES

"Removal of ABS by Sewage Treatment," McGauhey et al., Sew. & Ind. Wastes, August 1959, vol. 31, pages 877–899.

Yeomans: This Is The Cavitator, Sew. & Ind. Wastes, vol. 28, February 1956, page 51a.

House et al.: Radioactive ABS, Sew. and Ind. Wastes, April 1956, vol. 28, pages 492–506.

Eldib: Foam Fractionation, Water Pollution Control Federation Journal, September 1961, vol. 33, pages 914–931.

MORRIS O. WOLK, *Primary Examiner.*